J. G. PERRY.
Meat Cutter.
No. 29,400.
Patented July 31, 1860.
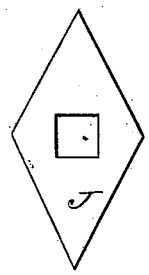
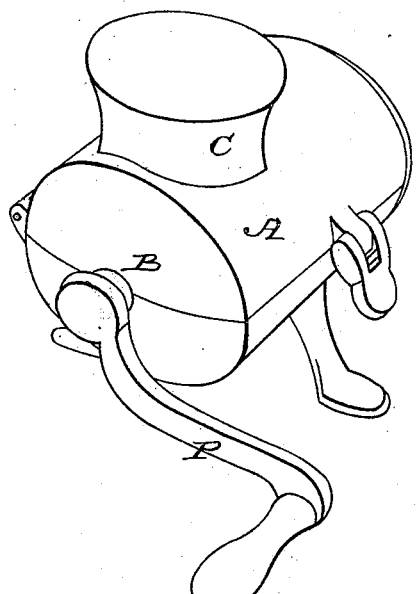
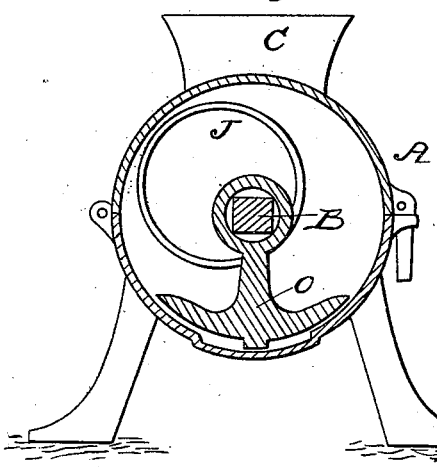
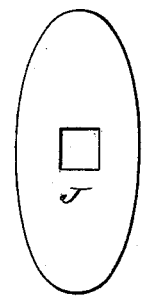
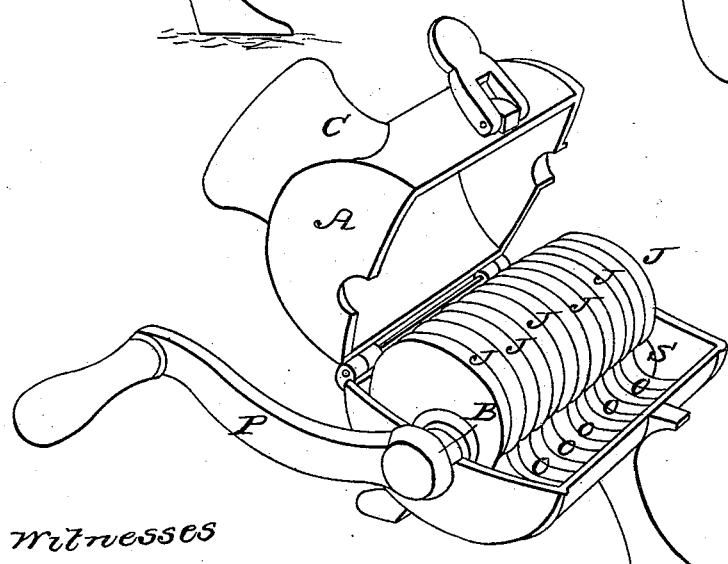
Witnesses
Inventor
John G. Perry

UNITED STATES PATENT OFFICE.

JOHN G. PERRY, OF SOUTH KINGSTON, RHODE ISLAND.

IMPROVED MEAT-CUTTER.

Specification forming part of Letters Patent No. 29,400, dated July 31, 1860.

*To all whom it may concern:*

Be it known that I, JOHN G. PERRY, of South Kingston, in the county of Washington, in the State of Rhode Island, have invented a new and Improved Meat-Cutter; and I do hereby declare that the following is a full and correct description thereof, reference being had to the accompanying drawings, and to the letters of reference marked thereon.

The same letters in all the figures denote the same parts.

In the drawings, Figure 1 is a perspective view of the machine. Fig. 2 is the same open to show the knives and other internal parts. Fig. 3 is a vertical section across the middle of the machine. Figs. 4 and 5 are different forms of knives.

To construct this machine, a case A is made, which is divided horizontally through its middle into an upper and lower part for the purpose of readily removing the knives and other internal parts for the purpose of cleaning, &c. A shaft B is placed in the center of the case and lengthwise of it, turning in bearings made in the ends of the case. A hopper C is placed on top near one end of the case, and a discharging-aperture S is made in the other end near the bottom, through which the meat is delivered when minced. A recess $h$ (see Fig. 3) is made in the bottom of the case inside throughout its whole length and tapering from one end to the other, being widest at the end where the meat is discharged. This recess may be made by cutting out a place in the bottom of the case or by putting in two cleats or projections, and thus forming a recess between them.

The knives J J are placed upon the shaft B, and made to turn with it either by making it square and having square holes in the knives J or in some other way. The pendants $o\ o\ o$ are also placed upon the shaft B, but are made loose, so as not to turn with it, and are put in between the knives J, their lower ends hanging down into the recess $h$ in the bottom of the case, the sides of the recess preventing them from turning when the meat is pushed against them. These pendants $o\ o$ may be made straight or with projections on each side near their lower ends, which serve to hold the meat up from the case, so that the knives will cut clear through it, and the knives running close to the pendants prevent the meat from drawing in between them, producing a perfectly free, clear, and easy cut without any jamming or mashing. The sides of the recess $h$, not being parallel to the shaft B, allow the pendants to form a slanting or spiral line from one end of the case to the other, which facilitates the passage of the meat as it is being cut toward the discharging-aperture S.

The reason for making the recess $h$ tapering is so that when the shaft B is turned the opposite way to use the other sides of the knives J the pendants $o\ o$ will form a line spiraling in the opposite direction to what they did before, so as to still pass the meat along to the same end of the case. The knives may be made round (see Fig. 3) or of various other shapes, some of which are shown in Figs. 4 and 5.

The operation is as follows: Motion being given to the shaft B by the crank P with one hand, the meat is put into the hopper C by the other, and is carried down against the pendants $o\ o$ by the knives J J, where it is held while the knives pass repeatedly through it until it is minced sufficiently fine, by which time it has worked along the sides of the pendants (which, as before stated, hang in a spiral line to the side of the case and shaft) to the opening S, and is thereby delivered from the mincing-chamber.

Having thus described this machine, what I claim as my invention, and desire to secure by Letters Patent, is—

The employment of the knives and pendants, combined substantially as herein described, and for the purposes set forth.

JOHN G. PERRY.

Witnesses:
 J. W. POTTER,
 HENRY BARBER.